US008945704B2

(12) United States Patent
Shibata et al.

(10) Patent No.: US 8,945,704 B2
(45) Date of Patent: Feb. 3, 2015

(54) MULTI-LAYER FILM, DECORATIVE MOLDING FILM AND MOLDED BODY

(75) Inventors: Junichi Shibata, Chiyoda-ku (JP); Hideaki Nitta, Chiyoda-ku (JP); Shoichi Maekawa, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/813,674

(22) PCT Filed: Jul. 29, 2011

(86) PCT No.: PCT/JP2011/067907
§ 371 (c)(1),
(2), (4) Date: Feb. 1, 2013

(87) PCT Pub. No.: WO2012/018099
PCT Pub. Date: Feb. 9, 2012

(65) Prior Publication Data
US 2013/0129990 A1    May 23, 2013

(30) Foreign Application Priority Data
Aug. 4, 2010  (JP) ................................ 2010-175141

(51) Int. Cl.
| B32B 7/02 | (2006.01) |
| B32B 27/08 | (2006.01) |
| B32B 27/30 | (2006.01) |
| B32B 27/36 | (2006.01) |
| B32B 3/10 | (2006.01) |

(52) U.S. Cl.
CPC . *B32B 27/08* (2013.01); *B32B 7/02* (2013.01); *B32B 2250/03* (2013.01); *B32B 2367/00* (2013.01); *B32B 27/308* (2013.01); *B32B 27/36* (2013.01); *B32B 27/365* (2013.01); *B32B 2250/02* (2013.01); *B32B 2250/24* (2013.01); *B32B 2270/00* (2013.01); *B32B 2274/00* (2013.01); *B32B 2451/00* (2013.01); *B32B 2509/00* (2013.01); *B32B 2605/003* (2013.01); *B32B 3/10* (2013.01); *Y10S 428/9133* (2013.01)
USPC ........... 428/212; 428/213; 428/332; 428/339; 428/412; 428/480; 428/913.3

(58) Field of Classification Search
CPC ...... B32M 7/02; B32M 27/08; B32M 27/308; B32M 27/36; B32M 27/365; B32M 2250/02; B32M 2250/03; B32M 2270/00; B32M 2274/00; B32M 2307/412; B32M 2367/00; B32M 2369/00; B32M 2451/00; Y10S 428/9133
USPC ................. 428/212, 213, 332, 339, 412, 480, 428/913.3
See application file for complete search history.

(56) References Cited

U.S. PATENT DOCUMENTS

| 2001/0019761 A1* | 9/2001 | Iriyama ........................ 428/200 |
| 2007/0184250 A1* | 8/2007 | Saito ............................. 428/206 |
| 2008/0284231 A1* | 11/2008 | Takei et al. ............... 297/452.48 |
| 2009/0246482 A1 | 10/2009 | Sugimura et al. |
| 2009/0252935 A1 | 10/2009 | Koyama et al. |

FOREIGN PATENT DOCUMENTS

| JP | 2009-196153 | 9/2009 |
| JP | 2009-234183 | 10/2009 |
| JP | 2009-234184 | 10/2009 |
| JP | 2010-105385 | 5/2010 |

OTHER PUBLICATIONS

International Search Report issued Nov. 1, 2011 in International (PCT) Application No. PCT/JP2011/067907.
International Preliminary Report on Patentability and Written Opinion issued Mar. 12, 2013 in International (PCT) Application No. PCT/JP2011/067907.

* cited by examiner

*Primary Examiner* — Betelhem Shewareged
(74) *Attorney, Agent, or Firm* — Wenderoth, Lind & Ponack, L.L.P.

(57) ABSTRACT

A multi-layer film which is excellent in transferability to a metal shape during thermoforming and hardly produces uneven thickness, wrinkles, whitening or cracks on the surface of the obtained molded article.
The multi-layer film has a layer (layer A) containing a polycarbonate resin and a polyester-based thermoplastic elastomer and a layer (layer B) containing an acrylic resin, wherein
the layer B is formed on at least one side of the layer A.

11 Claims, 1 Drawing Sheet

MULTI-LAYER FILM, DECORATIVE MOLDING FILM AND MOLDED BODY

TECHNICAL FIELD

The present invention relates to a multi-layer film used for the surface decoration of a molded product and a molded body thereof.

BACKGROUND ART

Decorative molding techniques such as in-mold transfer, in-mold lamination and vacuum pressure molding lamination have been used for home electric appliances, auto interior parts and miscellaneous goods, and application ranges thereof are widely expanding due to the enhancement of environmental consciousness and the progress of technical innovation in recent years. Decorative molding films obtained by carrying out printing, shaping or metal deposition on a film are used for decorative molding. Acrylic films, PET films and polycarbonate films have been used as base films for these.

Characteristic properties required for the base films include thermoformability that ensures a target shape to be accurately transferred, solvent resistance required for the decoration of the surface of a film such as printing, surface hardness, heat resistance, transparency and weather resistance. However, there is no base material which satisfies all the above requirements, and the above films have been used according to purpose while they sustain problems.

For example, acrylic films are often used for decorative molding, making use of their excellent transparency and weather resistance. However, the acrylic films are unsatisfactory in terms of toughness and therefore readily crack or burr during molding, and there is limitation to the application of the films in fields which require high heat resistance. Although it is possible to improve the toughness of an acrylic resin to some extent by adding rubber particles to the acrylic resin to obtain a resin composition, transparency is often impaired in this case. Various studies have been made on the structure and production process of rubber particles to prevent a rise in haze even when the rubber particles are added. However, as satisfactory rubber particles are not found yet, it is difficult to satisfy the requirement for toughness and use acrylic films in fields which require high transparency.

In the case of polycarbonate films, although they have high heat resistance, they are inferior to acrylic films in thermoformability and it is therefore difficult to apply them in fields in which a complex shape or a deep shape is transferred accurately. Further, they have low surface hardness and solvent resistance.

Although PET films are superior to polycarbonate films in solvent resistance and surface hardness, they are biaxially oriented films and inferior to acrylic films and polycarbonate films which are unstretched films in stretchability. Therefore, they may be inferior in thermoformability. Further, they are inferior to these amorphous resins in transparency and have lower weather resistance than acrylic films.

As one of measures to improve the characteristic properties of the base material, there is proposed a multi-layer film having an acrylic resin layer on at least one side of a polycarbonate resin layer (Patent Documents 1 to 10).

This multi-layer film has improved toughness and heat resistance as compared with an acrylic film and improved surface hardness, solvent resistance and weather resistance as compared with a polycarbonate film. Thus, it is aimed to obtain good balance among properties by making use of the advantages of these films. However, the above multi-layer film is a laminate made of resins having different heat deformation temperatures, and its thermoformability and appearance and transparency after molding have often come into question.

Although various studies have been made to improve the characteristic properties of a base material for a decorative molding film from the viewpoints of the improvement of a raw material and the constitution of a laminate, the characteristic properties of the base material are not satisfactory yet and the further improvement of the properties is desired.

(Patent Document 1) Japanese Patent No. 3457514
(Patent Document 2) Japanese Patent No. 3489972
(Patent Document 3) Japanese Patent No. 3904262
(Patent Document 4) JP-A 2005-231257
(Patent Document 5) JP-A 2005-219330
(Patent Document 6) JP-A 2007-160892
(Patent Document 7) JP-A 2009-172953
(Patent Document 8) JP-A 2009-234183
(Patent Document 9) JP-A 2009-234184
(Patent Document 10) JP-A 2009-248363

DISCLOSURE OF THE INVENTION

It is an object of the present invention to provide a multi-layer film which has excellent transferability to a mold shape during thermoforming and hardly produces uneven thickness, wrinkles, whitening or cracks on the surface of the obtained molded article. It is another object of the present invention to provide a multi-layer film which is excellent in toughness, transparency and surface hardness. It is still another object of the present invention to provide a decorative molding film obtained from the multi-layer film and a decorative molded body. It is a further object of the present invention to provide a process for producing the multi-layer film.

The inventors of the present invention conducted intensive studies on a multi-layer film having a polycarbonate resin layer and an acrylic resin layer from the viewpoint of the raw material of the polycarbonate resin layer. As a result, they found that when a specific elastomer is added to the polycarbonate resin, the thermoformability, toughness and transparency of the multi-layer film are improved. The present invention was accomplished based on this finding.

That is, the present invention is as follows.

1. A multi-layer film having a layer (layer A) containing a polycarbonate resin and a polyester-based thermoplastic elastomer and a layer (layer B) containing an acrylic resin, wherein
the layer B is formed on at least one side of the layer A.

2. The multi-layer film in the above paragraph 1, wherein the polyester-based thermoplastic elastomer comprises a hard segment composed of a polybutylene terephthalate unit and a soft segment composed of a polyester unit comprising an aromatic dicarboxylic acid and an aliphatic dicarboxylic acid as dicarboxylic acid components and a diol having 5 to 15 carbon atoms as a diol component.

3. The multi-layer film in the above paragraph 2, wherein the aromatic dicarboxylic acid is at least one selected from the group consisting of terephthalic acid, isophthalic acid, 1,5-naphthalenedicarboxylic acid, 2,6-naphthalenedicarboxylic acid, 4,4'-diphenyldicarboxylic acid, bis(4-carboxyphenyl)methane and bis(4-carboxyphenyl)sulfone.

4. The multi-layer film in the above paragraph 2, wherein the aliphatic dicarboxylic acid is a linear dicarboxylic acid having 4 to 12 carbon atoms.

5. The multi-layer film in the above paragraph 1, wherein the layer B is formed on both sides of the layer A.

6. The multi-layer film in the above paragraph 1 which has a total thickness of 20 to 200 μm.
7. The multi-layer film in the above paragraph 1 which has a haze of 4% or less.
8. A decorative molding film prepared by decorating one side of the multi-layer film of any one of the above paragraphs 1 to 7.
9. The decorative molding film in the above paragraph 8, wherein decoration is carried out by printing or metal deposition.
10. A decorative molded body including a substrate and the decorative molding film of the above paragraph 8 which is formed on the surface of the substrate.
11. A process for producing a multi-layer film having a layer A and a layer B formed on at least one side of the layer A, comprising the step of coextruding a molding material A for forming the layer A which contains a polycarbonate resin and a polyester-based thermoplastic elastomer and a molding material B for forming the layer B which contains an acrylic resin.
12. The production process in the above paragraph 11, wherein the polyester-based thermoplastic elastomer comprises a hard segment composed of a polybutylene terephthalate unit and a soft segment composed of a polyester unit comprising an aromatic dicarboxylic acid and an aliphatic dicarboxylic acid as dicarboxylic acid components and a diol having 5 to 15 carbon atoms as a diol component.
13. The production process in the above paragraph 12, wherein the aromatic dicarboxylic acid is at least one selected from the group consisting of terephthalic acid, isophthalic acid, 1,5-naphthalenedicarboxylic acid, 2,6-naphthalenedicarboxylic acid, 4,4'-diphenyldicarboxylic acid, bis(4-carboxyphenyl)methane and bis(4-carboxyphenyl)sulfone.
14. The production process in the above paragraph 12, wherein the aliphatic dicarboxylic acid is a linear dicarboxylic acid having 4 to 12 carbon atoms.

Figure 1:
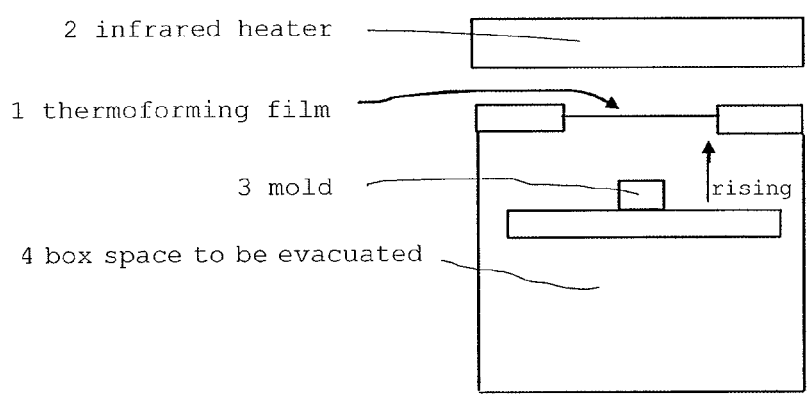
FIG. 1 is a schematic diagram of an apparatus for evaluating thermoformability used in Examples.

EXPLANATION OF REFERENCE NUMERALS 1 thermoforming film
2 infrared heater
3 mold
4 box space to be evacuated
5 groove on top surface of mold
6 corner edge of groove on top surface of mold

BEST MODE FOR CARRYING OUT THE INVENTION

The present invention will be described in detail hereinunder.

Multi-Layer Film

The multi-layer film of the present invention has a layer (layer A) containing a polycarbonate resin and a polyester-based thermoplastic elastomer and a layer (component B) containing an acrylic resin, which is formed on at least one side of the layer A.

Polycarbonate Resin

The polycarbonate resin is a polymer in which a dihydroxy compound is bonded by a carbonate bond and generally obtained by reacting a dihydroxy component with a carbonate precursor by interfacial polymerization or melt polymerization.

Typical examples of the dihydroxy component include 2,2-bis(4-hydroxyphenyl)propane (commonly known as "bisphenol A"), 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)cyclohexane, 1,1-bis(4-hydroxyphenyl)-3,3,5-trimethylcyclohexane, 1,1-bis(4-hydroxyphenyl)octane, 1,1-bis(4-hydroxyphenyl)decane, 9,9-bis{(4-hydroxy-3-methyl)phenyl}fluorene, 9,9-bis(4-hydroxyphenyl)fluorene, α,α'-bis(4-hydroxyphenyl)-m-diisopropylbezene, isosorbide, 1,3-propanediol, 1,4-butanediol and 1,6-hexanediol. It may be a homopolymer of any one of them or a copolymer of two or more of them. Bisphenol A is preferred from the viewpoints of physical properties and cost. In the present invention, a polycarbonate comprising bisphenol A in an amount of preferably 50 mol % or more, more preferably 60 mol % or more, much more preferably 90 mol % or more based on the total of all bisphenol components is used.

Specific examples of the polycarbonate include a homopolymer of bisphenol A, a copolymer of bisphenol A and 1,1-bis(4-hydroxyphenyl)-3,3,5-trimethylcyclohexane, and a copolymer of bisphenol A and 9,9-bis{(4-hydroxy-3-methyl)phenyl}fluorene. A homopolymer of bisphenol A is most preferred.

The glass transition temperature of the polycarbonate resin is preferably 100 to 200° C., more preferably 120 to 180° C. When the glass transition temperature is too high, the melt viscosity of a resin composition comprising the polycarbonate resin and the polyester-based thermoplastic elastomer becomes too high, thereby making it difficult to carry out melt film formation. When the glass transition temperature is too low, the heat resistance of the multi-layer film becomes unsatisfactory, which is not preferred for the purpose of the present invention.

As the carbonate precursor is used a carbonyl halide, carbonate ester or haloformate, as exemplified by phosgene, diphenyl carbonate and dihaloformates of a dihydric phenol.

To produce the polycarbonate resin by reacting the above divalent dihydroxy compound with the carbonate precursor by interfacial polycondensation or melt polymerization, a catalyst, a terminal capping agent and an antioxidant for a dihydric phenol may be used as required. The polycarbonate resin may be a branched polycarbonate resin obtained by copolymerizing a polyfunctional aromatic compound having 3 or more functional groups, or a polyester carbonate resin obtained by copolymerizing an aromatic or aliphatic bifunctional carboxylic acid. It may also be a mixture of two or more kinds of obtained polycarbonate resins.

The molecular weight of the polycarbonate resin is preferably 13,000 to 40,000 in terms of viscosity average molecular weight. When the molecular weight is lower than 13,000, the multi-layer film becomes fragile and readily cracks or burrs during thermoforming disadvantageously. When the molecular weight is higher than 40,000, the melt viscosity of the resin composition comprising the polycarbonate resin and the polyester-based thermoplastic elastomer becomes too high, thereby making it difficult to carry out melt film formation disadvantageously. The molecular weight is more preferably 15,000 to 35,000, much more preferably 20,000 to 32,000, particularly preferably 22,000 to 28,000. When a mixture of two or more polycarbonate resins is used, the molecular weight is the total molecular weight of the mixture. The viscosity average molecular weight (M) as used herein is obtained by measuring the specific viscosity ($\eta_{sp}$) of a solution containing 0.7 g of the polycarbonate dissolved in 100 ml of methylene chloride at 20° C. and inserting it into the following equation.

$\eta_{sp}/c=[\eta]+0.45\times[\eta]^2 c$ $[\eta]=1.23\times 10^{-4} M^{0.83}$ (c=0.7 g/dL, [η] is an intrinsic viscosity)

Polyester-Based Thermoplastic Elastomer

The polyester-based thermoplastic elastomer used in the present invention is a multi-block copolymer comprising a hard segment composed of a crystalline high-melting point polyester block unit and a low-melting point soft segment.

Hard Segment

The hard segment is a polyester segment composed of a polymer having a melting point of 150° C. or higher. Examples of the polyester include a polyester obtained by polymerizing an aromatic dicarboxylic acid or a derivative thereof with a diol component or a derivative thereof, a copolyester obtained by polymerizing two or more of these components, a polyester obtained by polymerizing oxyacid or a derivative thereof, and a polyester obtained by polymerizing an aromatic ether dicarboxylic acid or a derivative thereof with a diol component or a derivative thereof.

Examples of the aromatic dicarboxylic acid component include terephthalic acid, isophthalic acid, 1,5-naphthalenedicarboxylic acid, 2,6-naphthalenedicabroxylic acid, 4,4'-diphenyldicarboxylic acid, bis(4-carboxyphenyl)methane and bis(4-carboxyphenyl)sulfone. Out of these, terephthalic acid and 2,6-naphthalenedicarboxylic acid are preferred and terephthalic acid is more preferred.

Examples of the diol component include ethylene glycol, 1,3-propanediol, 1,4-butanediol, 1,5-pentanediol, 2,2-dimethyl-1,3-propanediol, 1,6-hexanediol, 1,7-heptanediol, 1,10-decanediol, p-xylylene glycol and cyclohexanediol. Out of these, diol components having 2 to 4 carbon atoms are preferred and 1,4-butanediol is more preferred.

The hard segment is preferably polybutylene terephthalate. Polybutylene terephthalate has excellent compatibility with a polycarbonate resin, is preferred from the viewpoints of transparency and thermoformability and is excellent in strength. Polybutylene terephthalate may contain another component as a comonomer as long as the effect of the present invention is not impaired. The amount of the comonomer is preferably 30 mol % or less, more preferably 20 mol % or less, much more preferably 10 mol % or less based on 100 mol % of the total of the dicarboxylic acid component and the diol component.

Soft Segment

The soft segment is the segment of a polymer which has a melting point of 100° C. or lower, or is liquid and amorphous at 100° C.

The soft segment is, for example, a polyester comprising a dicarboxylic acid component and a diol component.

The dicarboxylic acid component is preferably an aromatic dicarboxylic acid or a combination of an aromatic dicarboxylic acid and an aliphatic dicarboxylic acid. Examples of the aromatic dicarboxylic acid include terephthalic acid, isophthalic acid, 1,5-naphthalenedicarboxylic acid, 2,6-naphthalenedicarboxylic acid, 4,4'-diphenyldicarboxylic acid, bis(4-carboxyphenyl)methane and bis(4-carboxyphenyl)sulfone. Out of these, terephthalic acid and isophthalic acid are preferred. Two or more aromatic dicarboxylic acids may be used.

The aromatic dicarboxylic acid may be copolymerized with an aliphatic dicarboxylic acid or an alicyclic dicarboxylic acid. The aliphatic dicarboxylic acid is, for example, a linear dicarboxylic acid having 4 to 12 carbon atoms, preferably a linear dicarboxylic acid having 8 to 12 carbon atoms. Examples of the linear dicarboxylic acid include succinic acid, adipic acid and sebacic acid. Examples of the alicyclic dicarboxylic acid include cyclohexanedicarboxylic acid. The amount of the comonomer is suitably 40 mol % or less, preferably 30 mol % or less, more preferably 20 mol % or less based on 100 mol % of the total of all the dicarboxylic acid components.

The diol component is preferably a diol having 5 to 15 carbon atoms or a poly(alkyleneoxide)glycol. Preferred examples of the diol having 5 to 15 carbon atoms include hexamethylene glycol, decamethylene glycol, 3-methylpentanediol and 2-methyloctamethylenediol, out of which hexamethylene glycol is particularly preferred. Examples of the poly(alkyleneoxide)glycol include poly(ethyleneoxide)glycol and poly(tetramethyleneoxide)glycol. The polymerization degree of the alkyleneoxide is preferably 2 to 5.

The diol component may be copolymerized with a linear aliphatic diol having 2 to 4 carbon atoms such as ethylene glycol or tetramethylene glycol. The amount of the comonomer is suitably 40 mol % or less, preferably 30 mol % or less, more preferably 20 mol % or less based on 100 mol % of the total of all the diol components.

The soft segment is preferably a polyester comprising an aromatic dicarboxylic acid, an aliphatic dicarboxylic acid and a diol having 5 to 15 carbon atoms (may be referred to as "SS-1" hereinafter). SS-1 is preferred because extremely high transparency is obtained.

It is preferred that the soft segment SS-1 should have an aromatic dicarboxylic acid content of 60 to 99 mol % and an aliphatic dicarboxylic acid content of 1 to 40 mol % based on 100 mol % of the total of all the dicarboxylic acid components because high transparency is obtained. More preferably, the content of the aromatic dicarboxylic acid is 70 to 95 mol % and the content of the aliphatic dicarboxylic acid is 5 to 30 mol %. Much more preferably, the content of the aromatic dicarboxylic acid is 85 to 93 mol % and the content of the aliphatic dicarboxylic acid is 7 to 15 mol %. Particularly preferably, the content of the aromatic dicarboxylic acid is 89 to 92 mol % and the content of the aliphatic dicarboxylic acid is 8 to 11 mol %.

The aromatic dicarboxylic acid of the SS-1 is preferably terephthalic acid or isophthalic acid, particularly preferably isophthalic acid from the viewpoint of the reduction of crystallinity. The aliphatic dicarboxylic acid of the SS-1 is preferably a linear aliphatic dicarboxylic acid having 6 to 12 carbon atoms such as succinic acid, adipic acid or sebacic acid, particularly preferably sebacic acid.

The diol component having 5 to 15 carbon atoms of the SS-1 is preferably a linear aliphatic diol having 6 to 12 carbon atoms such as hexamethylene glycol, decamethylene glycol, 3-methyl pentanediol or 2-methyl octamethylenediol. Hexamethylene glycol is particularly preferred.

The SS-1 is particularly preferred as it has such high compatibility with the polycarbonate resin that a multi-layer film having high transparency can be obtained and is excellent in surface properties and transparency after thermoforming. The SS-1 is preferably a polyester which comprises isophthalic acid, sebacic acid and hexamethylene glycol.

The soft segment may also be a polyester which comprises an aromatic dicarboxylic acid and a poly(alkyleneoxide)glycol (may be referred to as "SS-2" hereinafter).

Examples of the aromatic dicarboxylic acid constituting the SS-2 include terephthalic acid, isophthalic acid, 1,5-naphthalenedicarboxylic acid, 2,6-naphthalenedicarboxylic acid, 4,4'-diphenyldicarboxylic acid, bis(4-carboxyphenyl)methane and bis(4-carboxyphenyl)sulfone. Out of these, terephthalic acid and isophthalic acid are preferred and terephthalic acid is particularly preferred.

The poly(alkyleneoxide)glycol constituting the SS-2 is represented by preferably $HO(CH_2CH_2O)_iH$ (i=2 to 5) or $HO(CH_2CH_2CH_2CH_2O)_iH$ (i=2 to 3), more preferably $HO(CH_2CH_2O)_iH$ (i=2 to 5), particularly preferably tri(ethyleneoxide)glycol.

A polyester which is produced from an aliphatic dicarboxylic acid having 2 to 12 carbon atoms and an aliphatic glycol having 2 to 10 carbon atoms may be used as the soft segment. Examples of the polyester include polyethylene adipate, polytetramethylene adipate, polyethylene sebacate, polyneopentyl sebacate, polytetramethylene dodecanate, polytetramethylene azelate and polyhexamethylene azelate.

Another example of the soft segment is a segment composed of a poly(alkyleneoxide)glycol. Examples of the poly(alkyleneoxide)glycol include polyalkylene ether glycols such as pol(ethyleneoxide)glycol, poly(propyleneoxide)glycol and poly(tetramethyleneoxide)glycol, and copolyether glycols obtained by copolymerizing these polyether glycol components. The number average molecular weight of the poly(alkyleneoxide)glycol is preferably 400 to 6,000, more preferably 500 to 3,000.

Still another example of the soft segment is a polylactone obtained by ring-opening polymerizing a lactone compound. The polylactone is preferably poly-ε-caprolactone. Further, a polyester polyether copolymer comprising the above polyester and a polyether may also be used as the soft segment.

Composition

In the present invention, as for the ratio of the hard segment to the soft segment in the polyester-based thermoplastic elastomer, suitably, the content of the hard segment is 20 to 70 wt % and the content of the soft segment is 80 to 30 wt % based on 100 wt % of the elastomer. Preferably, the content of the hard segment is 20 to 40 wt % and the content of the soft segment is 80 to 60 wt %. The intrinsic viscosity (value measured in o-chlorophenol at 35° C.) of the polyester-based thermoplastic elastomer is preferably 0.6 or more, more preferably 0.8 to 1.5, much more preferably 0.8 to 1.2. When the intrinsic viscosity falls below the above range, the strength of the multi-layer film may lower disadvantageously.

In the present invention, the content of the polyester-based thermoplastic elastomer in the layer A is preferably 3 to 50 parts by weight based on 100 parts by weight of the polycarbonate resin. When the content is lower than 3 parts by weight, the effect of improving thermoformability by the addition of the elastomer becomes unsatisfactory disadvantageously. When the content is higher than 50 parts by weight, the heat deformation temperature of the resin composition becomes too low, whereby the heat resistance of the multi-layer film becomes unsatisfactory disadvantageously. The content is more preferably 5 to 30 parts by weight, much more preferably 8 to 25 parts by weight.

The layer A of the present invention may contain various additives which are generally used in these resins. The additives include a heat stabilizer, an antioxidant, an ultraviolet absorbent, an antistatic agent and a dye. As long as the effect of the present invention is not impaired, the layer A may contain a reinforcing filler such as glass fibers.

Production of Polyester-Based Thermoplastic Elastomer

The polyester-based thermoplastic elastomer is a multi-block copolymer which can be obtained by melt kneading together the above hard segment and the above soft segment to carry out a reaction.

The intrinsic viscosity of the polymer of the hard segment is preferably 0.2 to 2.0, more preferably 0.5 to 1.5. The intrinsic viscosity of the polymer of the soft segment is preferably 0.2 to 2.0, more preferably 0.5 to 1.5.

The reaction is carried out at preferably 200 to 300° C., more preferably 220 to 260° C.

The number average molecular weights of the hard segment and the soft segment which have been multi-blocked are each preferably 500 to 7,000, more preferably 800 to 5,000.

Acrylic Resin

In the present invention, the acrylic resin for the layer B is mainly a polymer of a methacrylic acid ester or an acrylic acid ester. The acrylic resin is, for example, a homopolymer of methyl methacrylate, or a copolymer containing preferably 50 wt % or more, more preferably 70 wt % or more, much more preferably 80 wt % or more of methyl methacrylate.

Examples of another comonomer include ethyl methacrylate, butyl methacrylate, 2-ethylhexyl methacrylate, methyl acrylate, ethyl acrylate, butyl acrylate and 2-ethylhexyl acrylate.

Still another comonomer is an ethylenically unsaturated monomer. Examples thereof include vinyl aromatic compounds such as styrene, α-methylstyrene and vinyl toluene, diene-based compounds such as 1,3-butadiene and isoprene, alkenyl cyan compounds such as acrylonitrile and methacrylonitrile, acrylic acid, methacrylic acid, maleic anhydride and N-substituted maleimide. They may be used alone or in combination of two or more. The content of the comonomer is preferably 0 to 50 wt %, more preferably 0 to 30 wt %, much more preferably 0 to 20 wt %.

The production processes of the acrylic resin are roughly divided into emulsion polymerization, suspension polymerization and continuous polymerization. The acrylic resin used in the present invention may be produced by any one of the above polymerization processes.

As long as the effect of the present invention is not impaired, rubber particles may be added to the acrylic resin in order to improve burring and cracking during the thermoforming of the multi-layer film. The improvement of toughness by adding rubber particles to the acrylic resin is a known and widely used technique and may be employed in the present invention. In general, when the rubber particles are added, transparency tends to lower. Therefore, it is preferred that rubber particles having as high transparency as possible should be used in the present invention. Preferred examples of the rubber particles include rubber particles having a core-shell structure prepared by covering a core layer of an acrylic crosslinked elastic polymer with a methacrylic ester resin, and rubber particles having a three-layer structure prepared by covering a core layer of a methacrylic ester resin with an acrylic crosslinked elastic polymer and further with a methacrylic ester resin. These rubber particles having a multi-layer structure have high dispersibility in an acrylic resin and make it possible to obtain a multi-layer film having high transparency. In the present invention, the existence and nonexistence of rubber particles and the type, amount and size of the rubber particles when the rubber particles are contained should be determined by taking into consideration toughness and transparency required for a base film at the time of decorative molding in a comprehensive manner.

General additives such as a heat stabilizer, an ultraviolet absorbent, a light-resistant stabilizer, a colorant, a release agent, a lubricant, an antistatic agent and a delusterant may be added to the acrylic resin layer.

Lamination

The multi-layer film of the present invention is a multi-layer film comprising a layer A and a layer B which is formed on at least one side of the layer A. It is preferably a multi-layer film comprising the layer B formed on both sides of the layer A. Surface hardness is required for one side of the multi-layer film and solvent resistance is required for the other side for decoration in many cases when the multi-layer film is used as a decorative molding film. Therefore, it is preferred that an acrylic resin layer (layer B) should be formed on both sides. As compared with a laminate consisting of three layers made of two different kinds of resins, a laminate consisting of two layers made of two different kinds of resins tends to warp due to the difference in heat shrinkage factor between the two resins at the time of film formation by co-extrusion molding. Since the warp of the film may cause a problem when the film is decorated by printing or metal deposition in the subsequent step, it is preferred and recommended from this point of view that the acrylic resin layer (layer B) should be formed on both sides.

The multi-layer film of the present invention has a total thickness of preferably 20 to 200 µm, more preferably 50 to 150 µm, much more preferably 60 to 140 µm. When the total thickness is too small, it is difficult to handle the film, the film is not suitable for use as a decorative film, and it is also difficult to produce the film. When the total thickness is too large, it takes time to heat the film at the time of thermoforming, or thermoformability may deteriorate disadvantageously.

As for the preferred thickness constitution of the multi-layer film of the present invention, the thickness of the layer A preferably accounts for 30 to 90% of the total thickness. The thickness of the layer A accounts for more preferably 40 to 80%, much more preferably 50 to 70% of the total thickness.

The thickness of the layer B alone is preferably 5 µm or more. The thickness of the layer B alone means the thickness of the layer B formed on one side of the layer A. Therefore, in the case of a three-layer structure in which the layer B is formed on both sides of the layer A, the thickness of each of the layers B is preferably 5 µm or more, therefore making it a total thickness of 10 µm or more. When the thickness of the layer B alone is smaller than 5 µm, surface hardness and solvent resistance may become unsatisfactory disadvantageously. The thickness of the layer B alone is more preferably 10 µm or more, much more preferably 20 µm or more. The upper limit of the thickness of the layer B alone which is determined by the total thickness and the thickness of the layer A is preferably 70 µm or less, more preferably 50 µm or less.

It is preferred that the base film of the decorative molding film should have high transparency. The multi-layer film of the present invention has a haze of preferably 4% or less, more preferably 3% or less, much more preferably 2% or less, particularly preferably 1% or less.

Production of Multi-Layer Film

The multi-layer film of the present invention may be produced by a conventionally known process. Examples of the process include one in which all layers are separately formed and then laminated together or thermally compression bonded together, one in which one layer film formed in advance is used as a base film and one side or both sides of the film are coated to form the other layer, and one in which resin layers are laminated together by co-extrusion. The multi-layer film of the present invention is most preferably produced by the co-extrusion process out of these from the viewpoints of economic efficiency and production stability.

That is, the multi-layer film of the present invention can be produced by co-extruding a molding material A for the layer A and a molding material B for the layer B.

The molding material A contains a polycarbonate resin and a polyester-based thermoplastic elastomer. The polycarbonate resin and the polyester-based thermoplastic elastomer are as described above. The molding material A can be prepared by mixing together these components, melt kneading them together and pelletizing the resulting product. As the mixing means may be used a known means such as a Nauter mixer, a twin-cylinder mixer or a Henschel mixer. The multi-layer film of the present invention can be manufactured by supplying the pellet to a film production apparatus. The multi-layer film may also be produced by directly melt kneading together these components by means of an extruder and extruding the resulting product from a die when it is formed by the co-extrusion process without the above pelletizing step. The molding material B contains an acrylic resin. The acrylic resin is as described above.

The co-extrusion process is a process for obtaining a multi-layer film by melt extruding the molding materials A and B by using different extruders and laminating them together by using a feed block or multi manifold die. This process makes it possible to control the total thickness and thickness constitution of the obtained multi-layer film by adjusting the extrusion rates of these extruders, the film forming speed and the die lip interval.

In the case of the co-extrusion process, after a molten resin from the die is cooled with a cooling roll, it is rolled up to produce a film. In the present invention, a protection film may be attached to the multi-layer film to be rolled up. Particularly when the acrylic resin does not contain rubber particles, the slipperiness of the surface is unsatisfactory and therefore it may be difficult to roll up the film directly. In this case, it is preferred to attach the protection film to the multi-layer film to roll it up. A known protection film such as a polyethylene-based or polypropylene-based film may be used. When the acrylic resin contains rubber particles and the surface slipperiness of the obtained multi-layer film is satisfactory, it can be rolled up directly without using the protection film.

Decorative Molding Film

The decorative molding film of the present invention is a film obtained by decorating one side of the above-mentioned multi-layer film.

Examples of the decorating method include the formation of a pattern layer by printing, the formation of a thin film layer of a metal or a metal oxide and a combination of these.

As the printing method for forming a pattern layer, a known printing method such as gravure printing, plate printing, flexographic printing, dry offset printing, pat printing or screen printing may be used according to the shape of a product and printing purpose. Examples of the method for forming a thin film layer of a metal or a metal oxide include deposition, spraying and plating methods. Examples of the deposition method include vacuum deposition, sputtering, ion plating, thermal CVD, plasma CVD and optical CVD. Examples of the spraying method include atmospheric plasma spraying and low-pressure plasma spraying. Examples of the plating method include electroless plating, melt plating and electroplating. Out of these, the deposition method makes it easy to form a metal layer and is preferably used from the viewpoints of quality and environment.

A viscous layer or an adhesive layer may be further formed on a film produced by decorating one side of the multi-layer film. The viscous layer or the adhesive layer improves adhesion between an object to be decorated and a decorative molding film during thermoforming. In the case of vacuum forming or pressure forming, the decorated surface is often on the side of the object to be decorated and therefore, the viscous layer or the adhesive layer is preferably formed on the decorated surface of a base film. A heat sensitive or pressure sensitive adhesive or bonding agent which is suitable for the materials of the base film and the object to be decorated can be used. When the film has a viscous layer or an adhesive layer, it is provided while a release film is attached thereto.

The surface opposite to the object to be decorated of the decorative molding film of the present invention may be subjected to various surface treatments such as hard coating, water or oil repelling coating, ultraviolet absorption coating, infrared absorption coating and metal deposition coating.

Decorative Molded Body

The decorative molded body of the present invention includes a substrate and the above-mentioned decorative molding film formed on the surface of the substrate. The substrate is a molded product having the shape of a part which will be described hereinafter. The substrate is made of a resin such as thermoplastic resin or thermosetting resin.

Examples of the decorative molded body include auto interior materials, auto indicator panels, electric appliances, cosmetic cases, building interior and exterior parts, cases for equipment, products and miscellaneous goods, switches, keys, key pads, handles, levers, buttons, and housings and exterior parts for personal computers, cell phones and mobile equipment which are home electric appliances and AV equipment. These decorative molded bodies are excellent in the transferability of a decorative layer, have high surface hardness and excellent weather resistance and heat resistance, and are useful as products such as electronic and electric equipment, car parts, mechanical parts, construction materials, agricultural and fishing materials, shipping containers, packaging containers and miscellaneous goods.

The decorative molded bodies can be obtained by carrying out conventionally known molding with the decorative molding film.

The molding method is an in-mold decoration injection molding method such as an insert mold forming method in which a decorative molding film vacuum molded along with an injection mold in advance is set in a mold and a molten resin is injected into the mold to weld the film to a product simultaneously with injection molding.

Alternatively, although decoration is carried out in an injection mold, the decorative molding film is put on the cavity side of the mold under vacuum and bonded to a molded body by heat and pressure simultaneously with injection molding.

A method in which lamination is carried out by vacuum forming or pressure forming may also be employed.

When the decorative molding film is molded at the same time as injection molding in a decorating method in the injection mold, an in-mold transfer molding method in which only a decorative layer is transferred to a molded body is also preferably used. Further, new decorative molding methods such as an NGF molding method in which two chambers developed by Fuse Shinku Co., Ltd. are used to control vacuum and pressure and which attract attention as a new decorative molding method and a TOM method in which the NGF molding method is applied to carry out 3-D decorative molding can also be preferably used.

In these thermoforming methods, the film must be trimmed after the film is molded to a mold shape by vacuum forming, after injection molding is carried out, or after the film is bonded to a molded body and the molded body is taken out. When the multi-layer film of the present invention is used, burrs or cracks are hardly produced, thereby improving trimming properties and making it possible to obtain a decorative molded body efficiently.

As the means of heating the decorative molding film during thermoforming may be used an infrared heater, an electric heater, high frequency induction, a halogen lamp, microwaves, a high-temperature derivative (such as steam) or a laser.

EXAMPLES

The following examples are given to further illustrate the present invention. It is to be understood that the present invention is not limited to these examples. Physical properties were measured by the following methods in Examples and Comparative Examples.

(1) Viscosity Average Molecular Weight of Polycarbonate

The viscosity average molecular weight (M) of a polycarbonate is obtained by measuring the intrinsic viscosity ($\eta$) of a methylene chloride solution having a concentration of 0.7 g/dL at 20° C. and inserting it into the following equation.

$\eta_{sp}/c=[\eta]+0.45\times[\eta]^2 c$ ([$\eta$] is an intrinsic viscosity)

$[\eta]=1.23\times10^{-4} M^{0.83}$ $c=0.7$ (2) Glass Transition Temperature (Tg)

This was measured at a temperature elevation rate of 20° C./min by using the 2920 DSC of TA Instruments to obtain a fall point.

(3) Total Thickness of Multi-Layer Film

This was measured with the electronic micro film thickness meter of Anritsu Corporation as a value of the center portion in the width direction of a film.

(4) Thickness Constitution of Multi-Layer Film

This was measured by observing the section of a film with the VA-9710 laser microscope of Keyence Corporation. This is a value of the center portion in the width direction of the film.

(5) Light Transmittance and Haze of Film

These were measured by using the NDH-5000 haze meter of Nippon Denshoku Industries Co., Ltd.

(6) Surface Hardness of Film

The pencil hardness of the film was measured in accordance with JIS K 5600.

(7) Thermoformability

Figure 2:
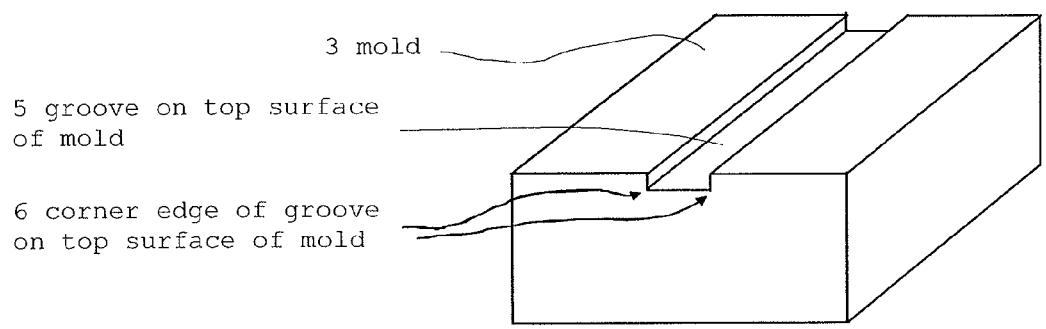
FIG. 2 is a schematic diagram of a mold for the apparatus for evaluating thermoformability used in Examples.

A vacuum forming machine shown in FIG. 1 and a mold shown in FIG. 2 were used to evaluate thermoformability.

An A4-size film (numeral 1) was set in the machine shown in FIG. 1, the periphery of the film was fixed, the top of the film was heated with an infrared heater (numeral 2) for a certain time, the film (numeral 1) was deformed by raising a mold (numeral 3) set on a table in a sealed box below the film, and the space (numeral 4) of the box below the film was evacuated to bond the film to the surface of the mold. As for the shape of the mold (numeral 3), it is a rectangular parallelpiped measuring 60 mm×60 mm×30 mm (height) and has a groove (numeral 5) having a width of 10 mm and a depth of 3 mm on the top, and the curvature radius (R) of the corner edge (numeral 6) of the groove (numeral 5) is 0.5 mm.

(i) Transferability

Transferability to a mold shape was evaluated by measuring the curvature radius (R) of the film corresponding to the corner edge of the groove in the top of the metal mold with an R surface meter, after thermoforming. When R is a value close to 0.5 mm, it is judged that the transferability of the film is high.

(ii) Appearance

The appearance of the film was observed visually to check the existence of a wrinkle and whitening.

(8) Toughness

In the evaluation of thermoformability by the vacuum forming machine, it was judged based on the following criteria whether the film was cracked or broken when it was stretched to a mold shape and released from the mold. Satisfactory: film is not cracked or broken when it is released
Cracked: film is cracked or broken when it is released.

Preparation Example 1

Production of Polyester-Based Thermoplastic Elastomer 175 parts by weight of dimethyl isophthalate, 23 parts by weigh of dimethyl sebacate and 140 parts by weight of hexamethylene glycol were transesterified by using a dibutyltin diacetate catalyst and the transesterified product was polycondensed under reduced pressure to obtain an amorphous polyester (soft segment) having an intrinsic viscosity of 1.06 and showing no heat absorption peak caused by the melting of a crystal when measured by DSC.

107 parts of a dry pellet (hard segment) of polybutylene terephthalate having an intrinsic viscosity of 0.98 which was obtained by polycondensation separately was added to this polyester and reacted with the polyester at 240° C. for 45 minutes, and 0.1 part of phenylphosphonic acid was added to terminate the reaction. The obtained polymer had a melting point of 190° C. and an intrinsic viscosity of 0.93.

Example 1

Molding Material A

A polycarbonate resin pellet (Panlite L-1250 of Teijin Chemicals Ltd., viscosity average molecular weight of 23,700) and the polyester-based thermoplastic elastomer produced above were pre-dried and mixed together in a weight ratio of 90/10 (100/11.1) (parts by weight) by means of a twin-cylinder mixer, and the resulting mixture was extruded at a cylinder temperature of 260° C. by means of a double-screw extruder to be pelletized so as to obtain the molding material A for the layer A. The glass transition temperature of the molding material A was 111° C.

Molding Material B

An acrylic resin (Acrypet VH001 of Mitsubishi Rayon Co., Ltd.; standard grade) was prepared as the molding material B for the layer B.

Co-Extrusion

The molding material A and the molding material B were each extruded from a T die having a width of 650 mm in accordance with feed-block system at cylinder temperatures of 260° C. (molding material A) and 250° C. (molding material B) by means of a single-screw extruder having a screw diameter of 40 mm, one side of the molten resin was brought into contact with a cooling roll to be cooled, and edge trimming was carried out to produce a multi-layer film having a three-layer structure consisting of layer B, layer A and layer B and a width of 400 mm. A polyethylene-based protection film having low adhesion was used to roll up the multi-layer film.

The total thickness of the obtained multi-layer film was 116 μm, and the thickness ratio of layer B, layer A and layer B of the film was 26/66/24 (μm). These values are values of the center portion in the width direction of the film, and the thickness nonuniformity in the width direction was ±3 μm. When the distribution in the width direction of thickness constitution was measured, the thickness nonuniformity of each layer was within ±2 μm which means that the film was highly uniform in thickness. The total light transmittance, haze and surface hardness of the film are shown in Table 1. The transferability of the film to a mold shape (R value) was satisfactory and it was found that even corner portions were accurately transferred to the film. The appearance of the film was good, no wrinkles, whitening and cracks were observed, and the film was not broken when it was released from the mold. The toughness of the film was satisfactory. These results are shown in Table 1.

Example 2

Film formation was carried out to obtain a multi-layer film having a total thickness of 134 μm in the same manner as in Example 1 except that the molding material B was changed to the Acrypet IRG304 (impact resistant grade) of Mitsubishi Rayon Co., Ltd. and the thickness ratio of layers and the take-up speed were changed. The physical properties of the film are shown in Table 1. Thermoformability and toughness were satisfactory as in Example 1.

Example 3

Film formation was carried out to obtain a multi-layer film having a total thickness of 82 μm in the same manner as in Example 1 except that the molding material B was changed to the ZK4BR (impact resistant grade) of Evonik Degussa Co., Ltd. and the thickness ratio of layers and the take-up speed were changed. The physical properties of the film are shown in Table 1. Thermoformability and toughness were satisfactory as in Example 1.

Example 4

A pellet of the molding material A was obtained by mixing together a polycarbonate resin and a polyester-based thermoplastic elastomer in the same manner as in Example 1 except that the weight ratio of the polycarbonate resin and the polyester-based thermoplastic elastomer was changed to 85/15 (100/17.6) (parts by weight). A multi-layer film was obtained by co-extruding the molding material A and an acrylic resin (Acrypet IRG304 of Mitsubishi Rayon Co., Ltd.) as the molding material B in the same manner as in Example 3. The physical properties of the obtained film are shown in Table 1. Thermoformability and toughness were satisfactory as in Example 3.

Example 5

Film formation was carried out to obtain a multi-layer film in the same manner as in Example 4 except that the molding material B was changed to the ZK4BR (impact resistant grade) of Evonik Degussa Co., Ltd. and the thickness ratio of layers was changed. The physical properties of the obtained film are shown in Table 1. Thermoformability and toughness were satisfactory as in Example 1.

Example 6

A pellet of the molding material A was obtained by mixing together a polycarbonate resin and a polyester-based thermoplastic elastomer and extruding the resulting mixture in the same manner as in Example 1 except that the weight ratio of the polycarbonate resin and the polyester-based thermoplastic elastomer was changed to 80/20 (100/25) (parts by weight). A multi-layer film was obtained by co-extruding the molding material A and an acrylic resin (Acrypet IRG304 of Mitsubishi Rayon Co., Ltd.) as the molding material B in the same manner as in Example 1. The physical properties of the obtained film are shown in Table 1. Thermoformability and toughness were satisfactory as in Example 1.

Example 7

A pellet of the molding material A was obtained by mixing together a polycarbonate resin and a polyester-based thermoplastic elastomer and extruding the resulting mixture in the same manner as in Example 1 except that a thermoplastic elastomer (trade name: Pelprene; grade S-1002) comprising PBT as a hard segment and poly-ε-caprolactone as a soft segment and manufactured by Toyobo Co., Ltd. was used as the polyester-based thermoplastic elastomer and the weight ratio of the polycarbonate resin and the polyester-based thermoplastic elastomer was changed to 85/15 (100/17.6) (parts by weight). A multi-layer film was obtained by co-extruding the molding material A and the ZK4BR (impact resistant grade) of Evonik Degussa Co., Ltd. as the molding material B in the same manner as in Example 1. The physical properties of the obtained film are shown in Table 1. Thermoformability and toughness were satisfactory as in Example 1.

Comparative Example 1

A multi-layer film having a total thickness of 113 μm was obtained in the same manner as in Example 1 except that only a polycarbonate resin (Panlite L-1250 of Teijin Chemicals Ltd.) was used in place of the molding material A. The physical properties of the obtained film are shown in Table 1. Although it had high toughness, the corner portions of the mold were not accurately transferred and the corner portions of the film were round. Thus, the film was inferior in transferability to a mold shape.

Comparative Example 2

Film formation was carried out to obtain a multi-layer film having a thickness of 77 μm in the same manner as in Comparative Example 1 except that the take-up speed was changed. The physical properties of the obtained film are shown in Table 1. Although the film had satisfactory toughness in a thermoforming test as in Comparative Example 1, it was inferior in transferability to a mold shape.

Comparative Example 3

An acrylic resin (Acrypet IRG304 of Mitsubishi Rayon Co., Ltd.) was extruded from a T die having a width of 650 mm at a cylinder temperature of 250° C. by means of a single-screw extruder having a screw diameter of 40 mm in accordance with not feed-block system but single-layer system and then an acrylic film having a width of 400 mm was obtained in the same manner as in Example 1. The physical properties of the obtained film are shown in Table 1. Although the film had satisfactory thermoformability, its toughness was unsatisfactory as it was cracked when it was released from the mold.

Comparative Example 4

Film formation was carried out to obtain a single-layer film in the same manner as in Comparative Example 3 except that the molding material A obtained in Example 1 was used and the cylinder temperature was changed to 260° C. The physical properties of the obtained film are shown in Table 1. Although the film was satisfactory in terms of thermoformability and toughness, it had extremely low surface hardness.

Comparative Example 5

A comparative molding material A was obtained by using polycaprolactone having a number average molecular weight of 10,000 (Placcel H1P of Daicel Chemical Industries, Ltd.) in place of the polyester-based thermoplastic elastomer and the Panlite L-1250 of Teijin Chemicals Ltd. as a polycarbonate resin pellet as in Example 1, extruding them in the same manner as in Example 1 to ensure that the weight ratio of the polycarbonate resin and the polycaprolactone became 94/6 (100/6.4) (parts by weight) and pelletizing the extruded product. The glass transition temperature of the comparative molding material A was 112° C.

A multi-layer film was obtained by co-extruding the comparative molding material A and an acrylic resin (Acrypet IRG304 of Mitsubishi Rayon Co., Ltd.) in the same manner as in Example 1. The physical properties of the obtained film are shown in Table 1. The film had high transparency and kept high transparency even after thermoforming. However, it was inferior in transferability to a mold shape during thermoforming.

Comparative Example 6

A comparative molding material A was obtained by using the polybutylene terephthalate resin of Polyplastics Co., Ltd. (Duranex 700FP ER201R) in place of the polyester-based thermoplastic elastomer and the Panlite L-1250 of Teijin Chemicals Ltd. as a polycarbonate resin pellet as in Example 1, extruding them in the same manner as in Example 1 to ensure that the weight ratio of the polycarbonate resin and the polybutylene terephthalate resin became 80/20 (100/25) (% by weight) and pelletizing the extruded product. The glass transition temperature of the comparative molding material A was 110° C.

A multi-layer film was obtained by co-extruding the comparative molding material A and an acrylic resin (Acrypet VH001 of Mitsubishi Rayon Co., Ltd.) in the same manner as in Example 1. The physical properties of the obtained film are shown in Table 1. The film had high haze and was markedly whitened even after thermoforming. It was inferior in transferability to a mold shape during thermoforming.

Comparative Example 7

A comparative molding material A was obtained by using tricresyl phosphate (TCP of Daihachi Chemical Industry Co., Ltd.) in place of the polyester-based thermoplastic elastomer and the Panlite L-1225WP of Teijin Chemicals Ltd. as a polycarbonate resin, extruding them in the same manner as in Example 1 to ensure that the weight ratio of the polycarbonate resin and TCP became 95/5 (100/5.3) (parts by weight) and pelletizing the extruded product. The glass transition temperature of the comparative molding material A was 118° C.

A multi-layer film was obtained by co-extruding the comparative molding material A and an acrylic resin (Acrypet IRG304 of Mitsubishi Rayon Co., Ltd.) in the same manner as in Example 1. The physical properties of the obtained film are shown in Table 1. The film had high transparency and kept high transparency even after thermoforming. However, it was inferior in transferability to a mold shape during thermoforming.

Example 8

One side of the multi-layer film obtained in Example 1 was screen printed by using a silk screen printing machine and printing ink and dried at 80° C. for 90 minutes to manufacture a decorative molding film. Printing could be carried out well without a problem.

Example 9

The decorative molding film obtained in Example 8 was placed on a mold having a groove with a width of 50 mm, a length of 80 mm and a depth of 10 mm to carry out vacuum forming at a preheating time of 20 seconds, a vacuum degree of 13.3 kPa and a cooling time of 20 seconds. Then, the molded product which was preliminarily shaped and from which an unwanted peripheral part was punched out was set in an injection mold in such a manner that a resin was filled onto the printed layer side, and an acrylic resin (Acrypet VH001 of Mitsubishi Rayon Co., Ltd.) was injection molded to obtain a decorated molded body having a width of 50 mm, a length of 80 mm and a depth of 10 mm. The decorative part of the obtained molded body was not broken or cracked and had no ink bleed, and a phenomenon such as an uneven pattern, an irregular color or a printing position gap was not observed. Thus, the molded body had excellent homogeneity.

TABLE 1

| | Layer A Resin composition PC/Elastomer (parts by weight) | Layer B Trade name of acrylic resin | Total thickness μm | Lamination Layer B/layer A/layer B μm/μm/μm | Total light transmittance % | Haze % | Surface hardness | thermoformability | | | |
|---|---|---|---|---|---|---|---|---|---|---|---|
| | | | | | | | | Transferability R (mm) | Appearance | | |
| | | | | | | | | | Wrinkle | Whitening | Toughness |
| Ex. 1 | 90/10 (100/11.1) | Acrypet VH001 | 116 | 26/66/24 | 92 | 0.3 | F | 1.2 | None | None | High |
| Ex. 2 | 90/10 (100/11.1) | Acrypet IRG304 | 134 | 30/73/31 | 92 | 1.3 | H | 1.5 | None | None | High |
| Ex. 3 | 90/10 (100/11.1) | ZK4BR | 82 | 19/42/21 | 92 | 2.1 | F | 0.8 | None | None | High |
| Ex. 4 | 85/15 (100/17.6) | Acrypet IRG304 | 78 | 18/44/16 | 92 | 1.4 | HB | 1.0 | None | None | High |
| Ex. 5 | 85/15 (100/17.6) | ZK4BR | 77 | 23/28/26 | 92 | 2.2 | F | 0.9 | None | None, | High |
| Ex. 6 | 80/20 (100/25) | Acrypet IRG304 | 105 | 20/64/21 | 92 | 1.2 | HB | 0.7 | None | None | High |
| Ex. 7 | 85/15 (100/17.6) | ZK4BR | 108 | 21/65/22 | 92 | 2.0 | F | 1.3 | None | None | High |

TABLE 1-continued

| | Layer A Resin composition PC/ Elastomer (parts by weight) | Layer B Trade name of acrylic resin | Total thickness μm | Lamination Layer B/ layer A/ layer B μm/μm/μm | Total light transmittance % | Haze % | Surface hardness | Thermoformability Transferability R (mm) | Appearance Wrinkle | Appearance Whitening | Toughness |
|---|---|---|---|---|---|---|---|---|---|---|---|
| C. Ex. 1 | 100/0 | Acrypet VH001 | 113 | 26/63/24 | 92 | 0.2 | F | 5.2 | Exist | None | High |
| C. Ex. 2 | 100/0 | Acrypet VH001 | 77 | 16/44/17 | 92 | 0.3 | F | 4.3 | Exist | None | High |
| C. Ex. 3 | — | Acrypet IRG304 | 117 | — | 92 | 1.0 | H | 1.0 | None | None | Cracked |
| C. Ex. 4 | 90/10 (100/11) | — | 100 | — | 90 | 0.3 | 4B | 1.5 | None | None | High |
| C. Ex. 5 | 94/6 (100/6.4) (PCL) | Acrypet IRG304 | 105 | 22/64/19 | 92 | 0.8 | F | 3.1 | Exist | None | High |
| C. Ex. 6 | 80/20 (100/25) PBT | Acrypet VH001 | 102 | 20/60/22 | 90 | 5.2 | F | 4.7 | Exist | Exist | High |
| C. Ex. 7 | 95/5 (100/5.3) (TCP) | Acrypet IRG304 | 108 | 23/63/22 | 92 | 0.5 | F | 2.8 | Exist | None | High |

Ex.: Example

Effect of the Invention

The multi-layer film of the present invention is excellent in thermoformability, toughness, heat resistance, transparency, appearance and transparency after molding, surface hardness and weather resistance. According to the production process of the present invention, the above multi-layer film having excellent characteristic properties can be produced.

INDUSTRIAL APPLICABILITY

The multi-layer film of the present invention is useful as a decorative molding material.

The invention claimed is:

1. A multi-layer film having a layer A containing a polycarbonate resin and a polyester-based thermoplastic elastomer and a layer B containing an acrylic resin, wherein the layer B is formed on both sides of the layer A, and
   wherein the polyester-based thermoplastic elastomer comprises a hard segment composed of a polybutylene terephthalate unit and a soft segment composed of a polyester unit comprising an aromatic dicarboxylic acid and an aliphatic dicarboxylic acid as a dicarboxylic acid component and a diol having 5 to 15 carbon atoms as a diol component.

2. The multi-layer film according to claim 1, wherein the aromatic dicarboxylic acid is at least one selected from the group consisting of terephthalic acid, isophthalic acid, 1,5-naphthalenedicarboxylic acid, 2,6-naphthalenedicarboxylic acid, 4,4'-diphenyldicarboxylic acid, bis(4-carboxyphenyl) methane and bis(4-carboxyphenyl)sulfone.

3. The multi-layer film according to claim 1, wherein the aliphatic dicarboxylic acid is a linear dicarboxylic acid having 4 to 12 carbon atoms.

4. The multi-layer film according to claim 1 which has a total thickness of 20 to 200 μm.

5. The multi-layer film according to claim 1 which has a haze of 4% or less.

6. A decorative molding film prepared by decorating one side of the multi-layer film of claim 1.

7. The decorative molding film according to claim 6, wherein decoration is carried out by printing or metal deposition.

8. A decorative molded body including a substrate and the decorative molding film of claim 6 which is formed on the surface of the substrate.

9. A process for producing the multi-layer film according to claim 1, comprising the step of coextruding a molding material A for forming the layer A which contains a polycarbonate resin and a polyester-based thermoplastic elastomer and a molding material B for forming the layer B which contains an acrylic resin,
   wherein the polyester-based thermoplastic elastomer comprises a hard segment composed of a polybutylene terephthalate unit and a soft segment composed of a polyester unit comprising an aromatic dicarboxylic acid and an aliphatic dicarboxylic acid as a dicarboxylic acid component and a diol having 5 to 15 carbon atoms as a diol component.

10. The production process according to claim 9, wherein the aromatic dicarboxylic acid is at least one selected from the group consisting of terephthalic acid, isophthalic acid, 1,5-naphthalenedicarboxylic acid, 2,6-naphthalenedicarboxylic acid, 4,4'-diphenyldicarboxylic acid, bis(4-carboxyphenyl) methane and bis(4-carboxyphenyl)sulfone.

11. The production process according to claim 9, wherein the aliphatic dicarboxylic acid is a linear dicarboxylic acid having 4 to 12 carbon atoms.

* * * * *